US012661940B2

(12) United States Patent
Fatic et al.

(10) Patent No.: US 12,661,940 B2
(45) Date of Patent: Jun. 23, 2026

(54) VEHICLE TRAILER COUPLING MECHANISM AND VEHICLE SUPPORT

(71) Applicant: Volkswagen Aktiengesellschaft, Wolfsburg (DE)

(72) Inventors: Armin Fatic, Foster City, CA (US); David Roh, San Francisco, CA (US); Rodrigo Castaman, Walnut Creek, CA (US); Gladys Leung, Union City, CA (US)

(73) Assignee: Volkswagen Aktiengesellschaft, Wolfsburg (DE)

( * ) Notice: Subject to any disclaimer, the term of this patent is extended or adjusted under 35 U.S.C. 154(b) by 382 days.

(21) Appl. No.: 18/498,958

(22) Filed: Oct. 31, 2023

(65) Prior Publication Data

US 2025/0135811 A1    May 1, 2025

(51) Int. Cl.
| | |
|---|---|
| *B60D 1/28* | (2006.01) |
| *B60D 1/04* | (2006.01) |
| *B60D 1/24* | (2006.01) |
| *B60D 1/64* | (2006.01) |

(52) U.S. Cl.
CPC ................. *B60D 1/28* (2013.01); *B60D 1/04* (2013.01); *B60D 1/246* (2013.01); *B60D 1/64* (2013.01)

(58) Field of Classification Search
CPC . B60D 1/28; B60D 1/04; B60D 1/246; B60D 1/64
See application file for complete search history.

(56) References Cited

U.S. PATENT DOCUMENTS

| | | |
|---|---|---|
| 4,715,610 A | 12/1987 | Wisdom |
| 7,992,887 B2 | 8/2011 | Cotnoir et al. |

FOREIGN PATENT DOCUMENTS

| | | | | |
|---|---|---|---|---|
| CN | 2738027 Y | * | 11/2005 | ........... F16K 5/0605 |
| DE | 102010011175 A1 | * | 10/2010 | ............. F16D 3/221 |
| DE | 102014107007 | | 11/2015 | |
| KR | 101028334 B1 | * | 4/2011 | |

* cited by examiner

*Primary Examiner* — Jacob D Knutson
(74) *Attorney, Agent, or Firm* — Peter Zura; LOZA & LOZA, LLP

(57) ABSTRACT

A coupling/locking mechanism, that includes a first and second coupling/locking portion, each having their respective housing that includes (i) first/second prongs comprising first/second cavities and tapered engaging ends, (ii) first/second semi-spherical ball locks configured in the cavities, and (iii) first/second openings. During engagement, the first tapered end is configured to contact a face of the second semi-spherical ball lock locking portion through the second opening, and the second tapered end is configured to contact a face of the first semi-spherical ball lock locking portion through the first opening to rotatably align the first and second semi-spherical balls along a joining plane to form a spherical ball lock in the cavity of the first prong and the cavity of the second prong. A spur gear engages with the spherical ball lock to rotatably offset the spherical ball lock from the joining plane to a configured offset plane.

20 Claims, 15 Drawing Sheets

1200

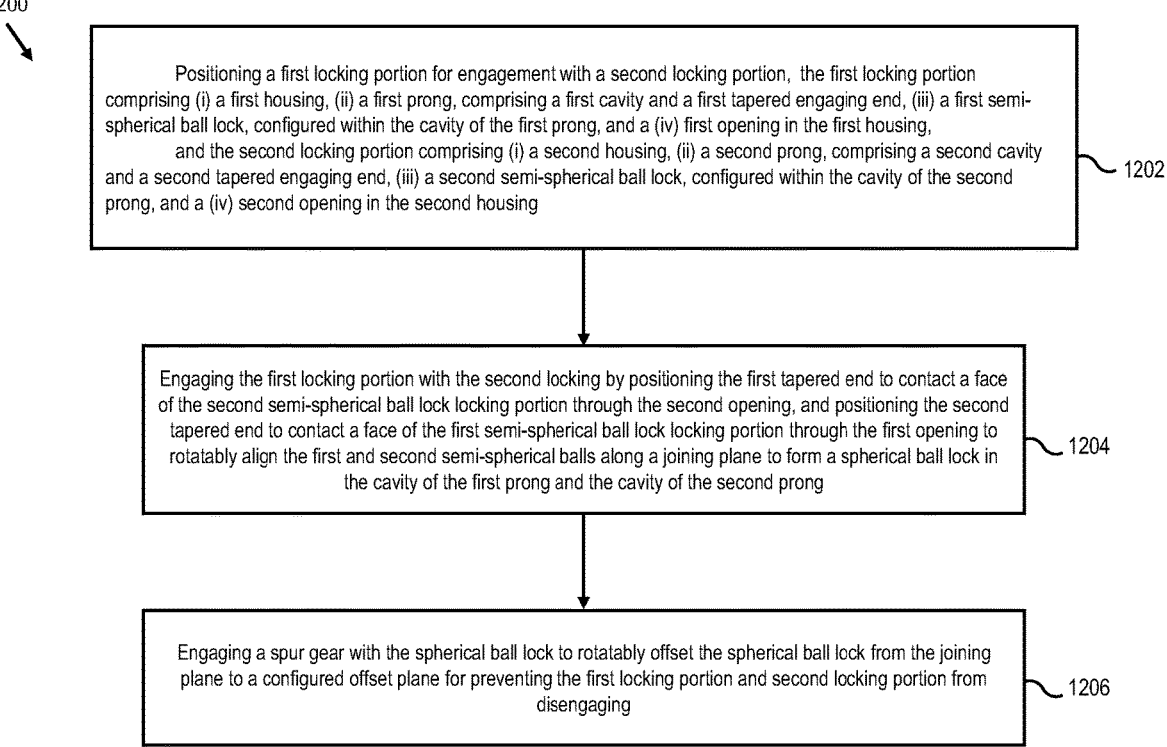

Positioning a first locking portion for engagement with a second locking portion, the first locking portion comprising (i) a first housing, (ii) a first prong, comprising a first cavity and a first tapered engaging end, (iii) a first semi-spherical ball lock, configured within the cavity of the first prong, and a (iv) first opening in the first housing, and the second locking portion comprising (i) a second housing, (ii) a second prong, comprising a second cavity and a second tapered engaging end, (iii) a second semi-spherical ball lock, configured within the cavity of the second prong, and a (iv) second opening in the second housing

1202

Engaging the first locking portion with the second locking by positioning the first tapered end to contact a face of the second semi-spherical ball lock locking portion through the second opening, and positioning the second tapered end to contact a face of the first semi-spherical ball lock locking portion through the first opening to rotatably align the first and second semi-spherical balls along a joining plane to form a spherical ball lock in the cavity of the first prong and the cavity of the second prong

1204

Engaging a spur gear with the spherical ball lock to rotatably offset the spherical ball lock from the joining plane to a configured offset plane for preventing the first locking portion and second locking portion from disengaging

VEHICLE TRAILER COUPLING MECHANISM AND VEHICLE SUPPORT

TECHNICAL FIELD

The present disclosure relates to vehicle trailer coupling mechanisms and vehicle support. More specifically, the present disclosure is directed to configurations for coupling a vehicle cabin securely to a trailer and providing vehicle support for coupling the vehicle cabin and the trailer during operation.

BACKGROUND

Vehicles, including semi-automated and automated vehicles have increasingly become a prominent solution for various transportation needs, including the hauling of trailers for cargo transport, public transport, recreational purposes, and other applications. Conventional automated vehicles are often equipped with trailer-hauling capabilities, typically achieved through a hitching mechanism. However, these prior art systems have shown several limitations and drawbacks, particularly when dealing with trailers and terrains that present challenges to effective attachment and smooth operation.

One problem with conventional vehicles designed for trailer hauling is the lack of a robust and reliable coupling/locking mechanism. Existing systems often rely on conventional hitches and couplings, which may result in insecure attachment and detachment, especially during vehicle maneuvers or when towing heavy loads. This limitation poses significant safety risks and operational inefficiencies. The limitations of existing locking mechanisms often lead to safety concerns. Inadequate attachment may result in unexpected detachment, risking damage to the trailer, cargo, or even endangering road users. Additionally, unreliable locking mechanisms may necessitate constant monitoring and adjustments, leading to operational inefficiencies and increased maintenance requirements. Many conventional locking mechanisms lack adaptability and compatibility with various trailer types and sizes. This limits the versatility of automated vehicles, as they may not be suitable for a broad range of trailer configurations, including those with unconventional coupling requirements.

Another deficiency in conventional vehicles, particularly three-wheel vehicles, is their lack of an effective suspension system designed to align the vehicle with the trailer and provide a stable and comfortable ride, even on uneven or rough roads. The absence of such features can lead to increased wear and tear on both the vehicle and the trailer, as well as potential damage to the cargo being transported. Many conventional vehicles with trailer-hauling capabilities face difficulties when navigating off-road or traversing bumpy terrains. The inability to maintain alignment with the trailer and ensure a smooth ride over uneven surfaces limits the practicality and versatility of these vehicles for various applications, including construction, agriculture, and recreational activities.

In view of these challenges and limitations, there is a need for need for an improved locking mechanism and advanced suspension system for vehicles designed for trailer hauling. Such a mechanism should ensure a secure, reliable, and adaptable attachment to trailers, eliminating safety risks, reducing operational complexities, and enhancing the overall functionality of automated vehicles in trailer transport applications. Such a vehicle should ensure secure attachment to the trailer, ease of use, enhanced stability, and the ability to operate effectively across diverse terrains.

SUMMARY

The present disclosure addresses the aforementioned limitations in the prior art by introducing an innovative and highly effective coupling/locking mechanism and suspension specifically designed for vehicles engaged in trailer hauling. This novel coupling/locking mechanism ensures secure attachment, minimizes safety risks, eliminates reliability concerns, and offers compatibility with a wide range of trailer configurations. A sophisticated suspension system is further disclosed that ensures proper alignment with the trailer and enables smooth operation even in rugged or uneven environments. This innovative combination of features significantly improves the safety, efficiency, and versatility of automated vehicles for trailer hauling, making them suitable for a wide range of applications and terrains.

In some examples, a coupling/locking mechanism is disclosed, comprising: a first locking portion, comprising (i) a first housing, (ii) a first prong, comprising a first cavity and a first tapered engaging end, (iii) a first semi-spherical ball lock, configured within the cavity of the first prong, and a (iv) first opening in the first housing; and a second locking portion, configured to engage with the first locking portion, the second locking portion comprising (i) a second housing, (ii) a second prong, comprising a second cavity and a second tapered engaging end, (iii) a second semi-spherical ball lock, configured within the cavity of the second prong, and a (iv) second opening in the second housing, wherein, during engagement, the first tapered end is configured to contact a face of the second semi-spherical ball lock locking portion through the second opening, and the second tapered end is configured to contact a face of the first semi-spherical ball lock locking portion through the first opening to rotatably align the first and second semi-spherical balls along a joining plane to form a spherical ball lock in the cavity of the first prong and the cavity of the second prong.

In some examples, a method of operating a coupling/locking mechanism is disclosed, comprising: positioning a first locking portion for engagement with a second locking portion, the first locking portion comprising (i) a first housing, (ii) a first prong, comprising a first cavity and a first tapered engaging end, (iii) a first semi-spherical ball lock, configured within the cavity of the first prong, and a (iv) first opening in the first housing, and the second locking portion comprising (i) a second housing, (ii) a second prong, comprising a second cavity and a second tapered engaging end, (iii) a second semi-spherical ball lock, configured within the cavity of the second prong, and a (iv) second opening in the second housing; and engaging the first locking portion with the second locking by positioning the first tapered end to contact a face of the second semi-spherical ball lock locking portion through the second opening, and positioning the second tapered end to contact a face of the first semi-spherical ball lock locking portion through the first opening to rotatably align the first and second semi-spherical balls along a joining plane to form a spherical ball lock in the cavity of the first prong and the cavity of the second prong.

In some examples, a coupling/locking mechanism is disclosed, comprising: a first locking portion configured on a vehicle, the first locking portion comprising (i) a first housing, (ii) a first prong, comprising a first cavity and a first tapered engaging end, (iii) a first semi-spherical ball lock, configured within the cavity of the first prong, and a (iv) first opening in the first housing; and a second locking portion configured on a trailer, the second locking portion config-
ured to engage with the first locking portion, and the second
locking portion comprising (i) a second housing, (ii) a
second prong, comprising a second cavity and a second
tapered engaging end, (iii) a second semi-spherical ball lock,
configured within the cavity of the second prong, and a (iv)
second opening in the second housing, wherein, during
engagement, the first tapered end is configured to contact a
face of the second semi-spherical ball lock locking portion
through the second opening, and the second tapered end is
configured to contact a face of the first semi-spherical ball
lock locking portion through the first opening to rotatably
align the first and second semi-spherical balls along a
joining plane to form a spherical ball lock in the cavity of the
first prong and the cavity of the second prong.

In some examples, a vehicle and trailer are disclosed,
configured with the coupling/locking mechanism disclosed
herein.

The detailed description and accompanying drawings that
follow will provide an in-depth understanding of the inven-
tive locking mechanism and suspension, its operational
advantages, and its potential applications in the field of
vehicles and trailer hauling. This transformative technology
has the potential to revolutionize the way vehicles securely
attach to and transport trailers, unlocking new possibilities
for efficiency, safety, and versatility in transportation and
logistics.

BRIEF DESCRIPTION OF THE FIGURES

The present invention is illustrated by way of example
and not limitation in the figures of the accompanying
drawings, in which like references indicate similar elements
and in which:

FIG. 12 illustrates a method of operating a locking
mechanism, according to come aspect of the present disclo-
sure.

DETAILED DESCRIPTION

Figure 1:
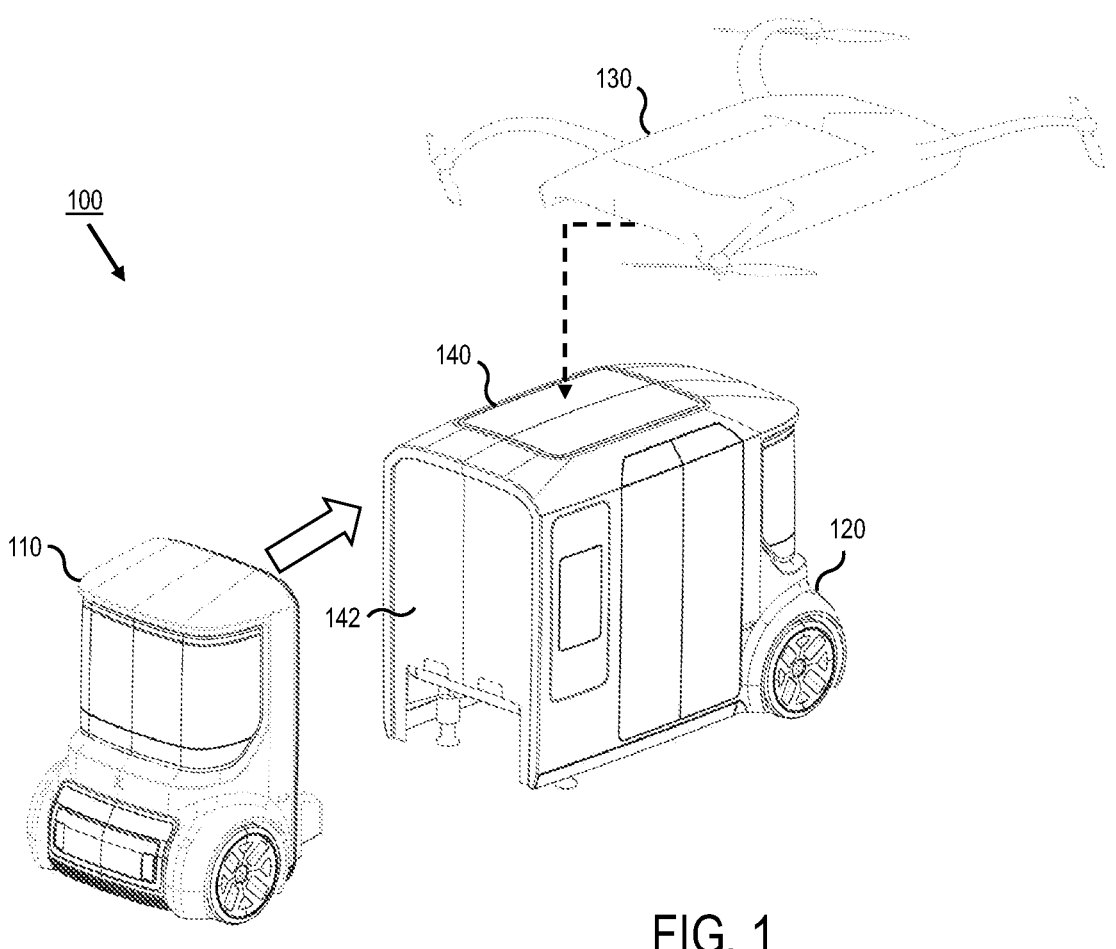
FIG. 1 shows an exemplary vehicle and trailer configu-
ration prior to coupling, according to some aspects of the
present disclosure.

The figures and descriptions provided herein may have
been simplified to illustrate aspects that are relevant for a
clear understanding of the herein described devices, struc-
tures, systems, and methods, while eliminating, for the
purpose of clarity, other aspects that may be found in typical
similar devices, systems, and methods. Those of ordinary
skill may thus recognize that other elements and/or opera-
tions may be desirable and/or necessary to implement the
devices, systems, and methods described herein. But
because such elements and operations are known in the art,
and because they do not facilitate a better understanding of
the present disclosure, a discussion of such elements and
operations may not be provided herein. However, the present
disclosure is deemed to inherently include all such elements,
variations, and modifications to the described aspects that
would be known to those of ordinary skill in the art.

Exemplary embodiments are provided throughout so that
this disclosure is sufficiently thorough and fully conveys the
scope of the disclosed embodiments to those who are skilled
in the art. Numerous specific details are set forth, such as
examples of specific components, devices, and methods, to
provide this thorough understanding of embodiments of the
present disclosure. Nevertheless, it will be apparent to those
skilled in the art that specific disclosed details need not be
employed, and that exemplary embodiments may be embod-
ied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Turning to FIG. 1, the drawing shows an exemplary vehicle (110, 130) and trailer 120 configuration 100 prior to coupling, according to some aspects of the present disclosure. In this example, a vehicle 110 is shown as approaching a front docking area 142 of a trailer 120 for coupling, illustrated as the large directional arrow in the figure. Additionally, the configuration 100 also illustrates a drone 130 that is approaching a top docking area 140 of trailer 120.

As the vehicle (110, 130) makes contact with the docking area (142, 140) the locking or coupling mechanism described in detail below secures the vehicle (110, 120) to the trailer 120. It should be understood by a person skilled in the art that the term "vehicle" is intended to be interpreted broadly, and may include any land, air or water vehicle. These include, but are not limited to, automobiles (manually driven, semi- and/or fully-autonomous), truck cabins, buses, trains, trams, trolleys, airplanes, helicopters, drones, gliders, boats, ships, ferries, and hovercrafts. While the examples provided below are primarily directed to road-based vehicles, it should be understood that the technologies and techniques described herein are equally applicable to any of the aforementioned air and/or water vehicles. Similarly, the trailer 120 may be configured as any type of trailer configured to carry human passengers and/or any animate objects (e.g., livestock) or inanimate objects (e.g., mechanical parts, goods, parcels, electronics).

Figure 2:
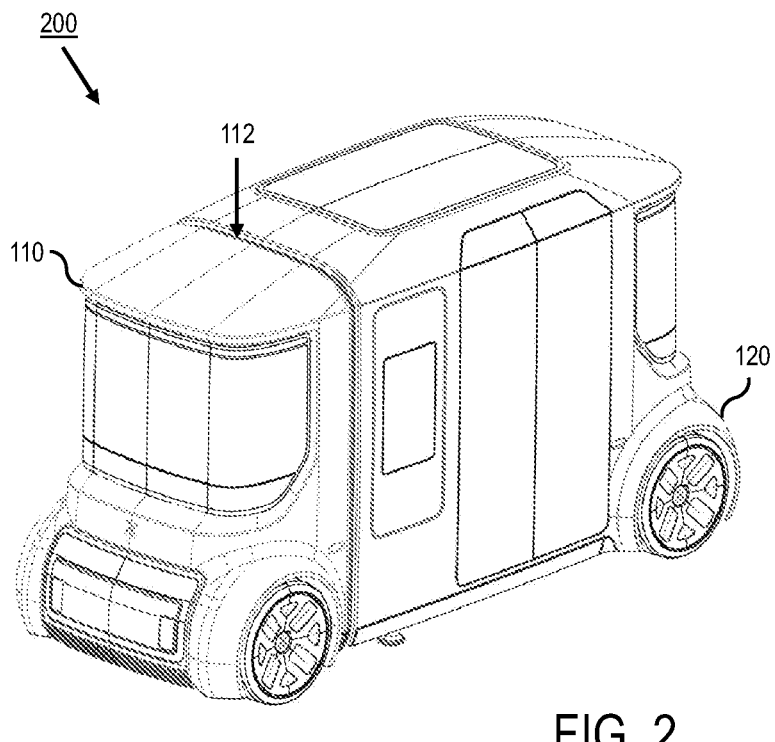
FIG. 2 shows an exemplary vehicle and trailer configu-
ration after coupling, according to some aspects of the
present disclosure.

FIG. 2 shows an exemplary vehicle and trailer configuration after coupling 200, according to some aspects of the present disclosure. Here, it can be seen that the vehicle 110 is docked with the trailer 120 at docking point or docking plane 112, at which time the locking mechanism (300) described in greater detail below is in a fully locked position. At this point, the vehicle 110 is configured to drive away together with the trailer 120 to a configured destination. While not described in detail in FIG. 2, in the example of the drone 130, the drone 140 would dock with the trailer 120 at docking point or docking plane 140, at which point the locking mechanism (300) described in greater detail below is in a fully locked position. In this example however, the locking mechanism (300) would be configured to lock in a vertical position, as opposed to the lateral position used for docking the vehicle 110.

Figure 3:
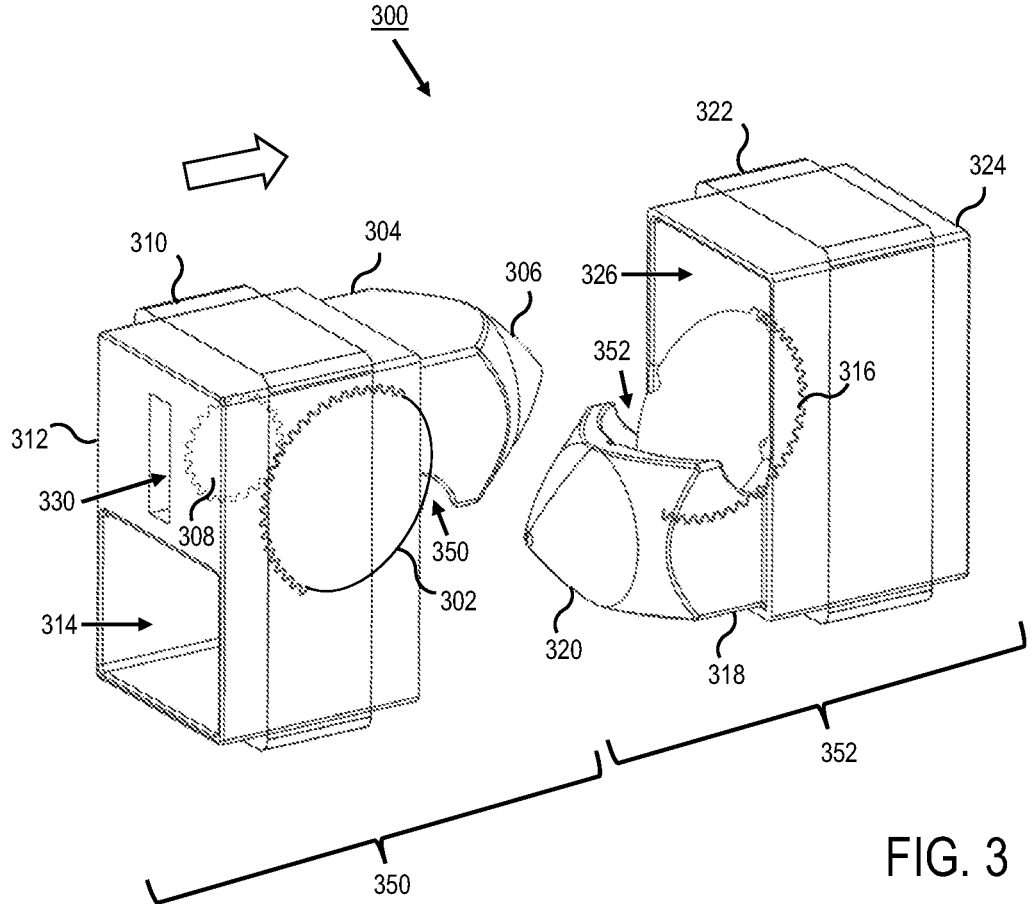
FIG. 3 illustrates a perspective view of two portions of a
locking mechanism prior to the two portions coupling,
according to some aspects of the present disclosure.

FIG. 3 illustrates a perspective view of two portions (350, 352) of a locking mechanism 300 prior to the two portions coupling, according to some aspects of the present disclosure. In this example, a first locking portion 350, which may be configured for a coupling side (e.g., e.g., vehicle 110) side, and a second locking portion 352 may be configured for a receiving side (e.g., trailer 120), wherein the first locking portion 350 travels in the direction of the large arrow as shown in the figure towards the second locking portion 352. The first locking portion 350 comprises a first prong 304 including a first tapered engaging end 306. In this example, the prong 304 may be configured with a tapered engaging end 306 as shown in the figure. In some examples, the engaging end 306 of prong 304 may be configured in a conical shape to engage with a face of a second semi-spherical ball lock 316, as discussed in greater detail below. A person of ordinary skill in the art will appreciate that the engaging end 306 of prong 304 may be configured in other suitable shapes, such as a triangular or trapezoidal shape.

The first locking portion 350 of the locking mechanism 300 also includes a first semi-spherical (e.g., "half-sphere") ball lock 302, configured in a cavity 350 of the first prong 304. As can be seen in the figure, the curved portion of the first semi-spherical ball lock 302 includes gears that are configured to engage with a spur gear 308 that is preferably loaded, e.g., via spring loading, magnetic loading, and/or other suitable to guide the first semi-spherical ball lock 302 to rotate along a center axis in clockwise (see FIGS. 4B-C) and counter-clockwise (see FIG. 4D) directions. The spur gear 308 may be installed in housing 312 through opening 330, wherein the opening 330 is configured with sufficient space to allow full rotation of the spur gear 308. The first locking portion 350 of locking mechanism 300 also may include a sleeve 310 over the housing 312, wherein an opening 314 is provided in the housing below the first prong 304. It should be understood by persons having ordinary skill in the art that the configuration of the opening 314 relative to the first prong 304 depends on the orientation of the locking mechanism 300. Thus, for example, in alternate configurations, the opening 314 may be above, to the left, or to the right of the first prong 314 if the locking mechanism is turned 180°, 90° clockwise, or 90° counter-clockwise, respectively. Of course, other orientations are contemplated in the present disclosure.

The locking mechanism also includes the second locking portion 352, which may be configured as an inverse configuration of first locking portion 350. Similar to the first locking portion 350, the second locking portion 352 comprises a second prong 318 including a second tapered end 320. In this example, the prong 318 may be configured with a tapered engaging end 320 as shown in the figure. In some examples, the tapered engaging end 320 of prong 318 may also be configured in a conical shape to engage with a face of the first semi-spherical ball lock 302. A person of ordinary skill in the art will appreciate that the tapered engaging end 320 of prong 318 may be configured in other suitable shapes, such as a triangular or trapezoidal shape.

The second locking portion 352 of the locking mechanism 300 also includes a second semi-spherical ball lock 316, configured in a cavity 352 of the second prong 318. As can be seen in the figure, the curved portion of the second semi-spherical ball lock 316 may include gears that are configured to engage with a second spur gear (not shown) similar to spur gear 308 that may also be loaded, e.g., via spring loading, magnetic loading, and/or other suitable to guide the second semi-spherical ball lock 316 to rotate along a center axis in clockwise (see FIGS. 4B-C) and counter-clockwise (see FIG. 4D) directions, complimentary to the direction of the first semi-spherical ball lock 302. However, in some examples, the second spur gear is not absolutely necessary. The second locking portion 352 of locking mechanism 300 also may include a sleeve 322 over the housing 324, wherein an opening 326 is provided in the housing 324 above the second prong 318 to guide the prong 318 as it moves through the housing 324. Similar to the first locking portion 350, it should be understood by persons having ordinary skill in the art that the configuration of the opening 326 relative to the second prong 318 (e.g., above, below, left, right) depends on the orientation of the locking mechanism 300.

It should be understood by a person skilled in the art that terms such as "locking mechanism", "locking portion", "semi-spherical ball lock", "ball lock", and the like, as used herein, may be interpreted synonymously as a "coupling mechanism", "coupling portion", semi-spherical ball coupler" and "ball coupler", respectively. As described herein, the locking mechanism (e.g., 300) is configured to operationally perform both a coupling function and a locking function, and the two concepts should not be interpreted as being mutually exclusive from one another.

Figure 4A:
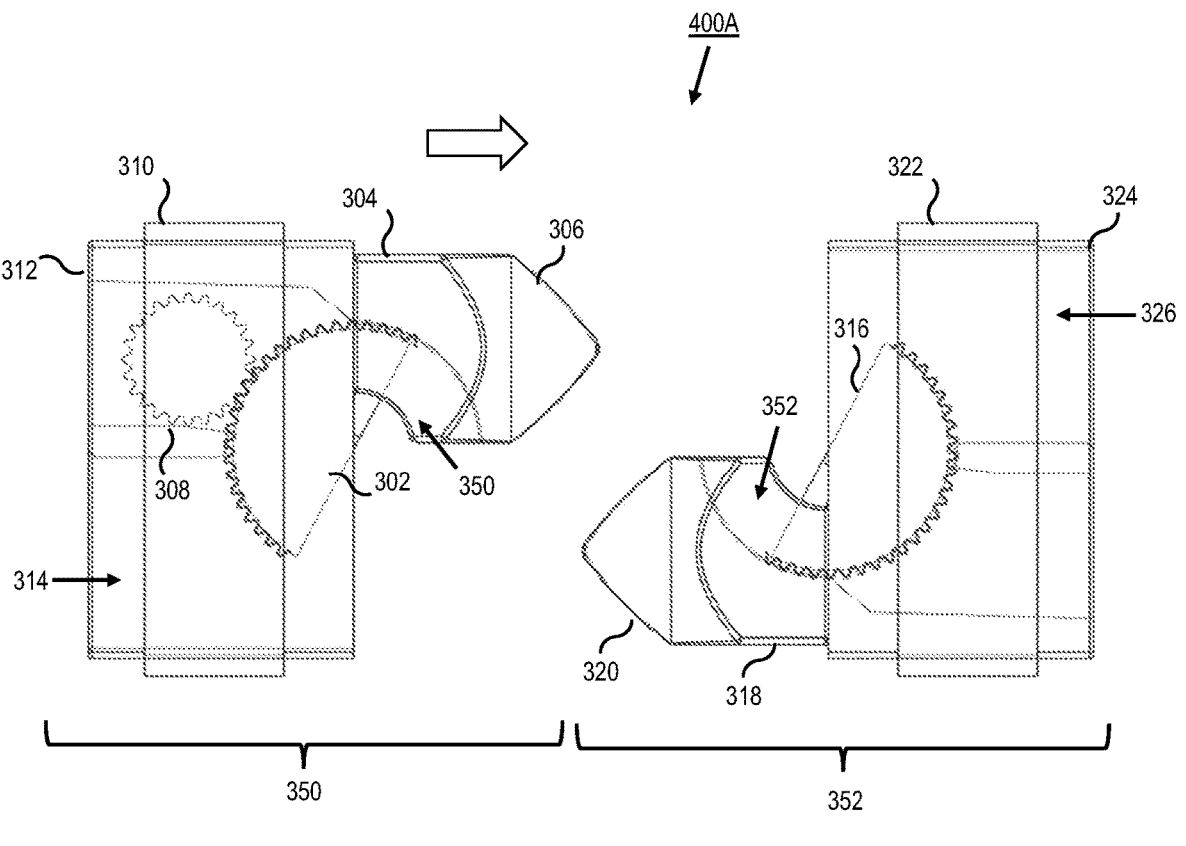
FIG. 4A illustrates a side view of two portions of a locking
mechanism prior to the two portions coupling, according to
some aspects of the present disclosure.

FIG. 4A illustrates a side view 400A of two portions 350, 362 a locking mechanism (e.g., 300) prior to the two portions coupling, according to some aspects of the present disclosure. In this example, the reference numbers represent the same reference numbers discussed above in connection with FIG. 3, except as otherwise indicated. Here, the first locking portion 350, which may be part of a vehicle (e.g., 110) is moved in the direction of the large arrow towards the second locking portion 352, which may be part of a trailer (e.g., 120)

Figure 4B:
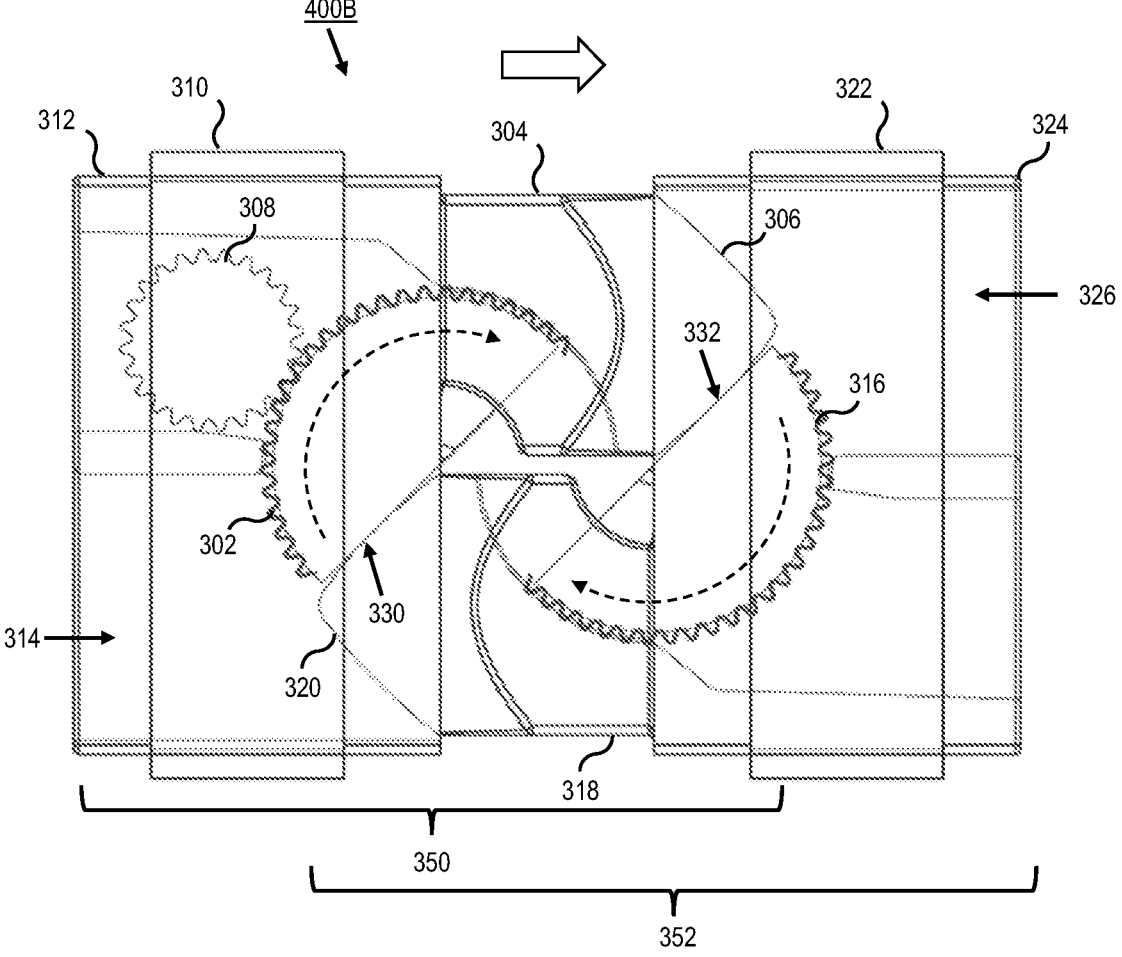
FIG. 4B illustrates a side view of the two portions of the
locking mechanism engaging during a coupling process,
according to some aspects of the present disclosure.

In the example 400B of FIG. 4B, the first locking portion 350 continues to move in the direction of the large arrow until the engaging end 306 of prong 304 makes contact 332 with the face of the second semi-spherical ball lock 316, and the engaging end 320 of prong 318 makes contact 330 with the face of the first semi-spherical ball lock 302. Because of the generally tapered shape of the engaging ends 306, 320, further movement of the locking portions 350, 352 causes each semi-spherical ball lock 302, 316 to rotate along a common axis in a direction away from the contact area of each engaging end 306, 320, as shown by the dotted arrows in the figure.

Figure 4C:
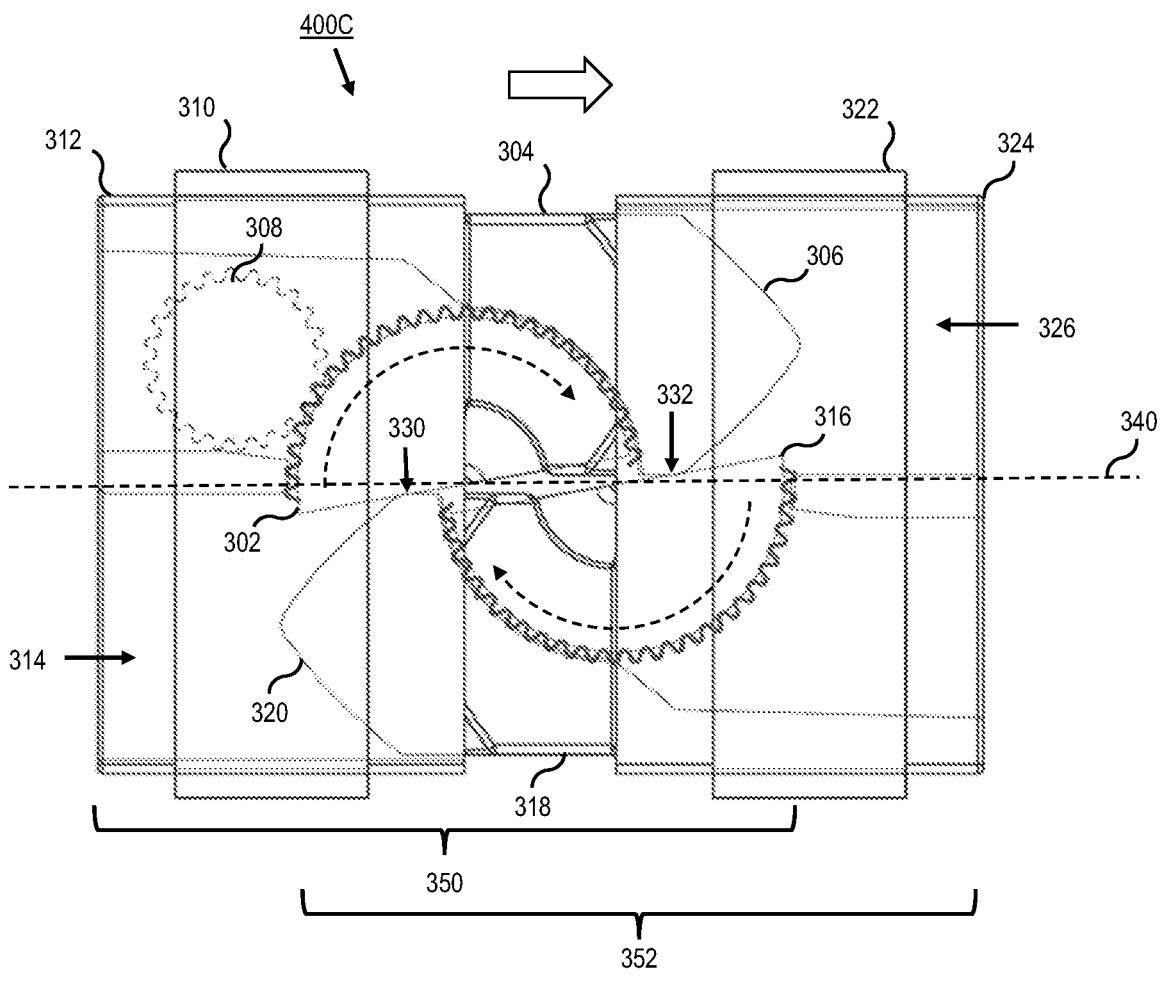
FIG. 4C illustrates a side view of the two portions of the
locking mechanism further engaging during a coupling
process, according to some aspects of the present disclosure.

Continuing to the example 400C of FIG. 4C, the first locking portion 350 continues to move still further in the direction of the large arrow as the engaging end 306 of prong 304 continues through the guided opening 326 and across the face of the second semi-spherical ball lock 316, maintaining contact at 332 as shown in the figure. The engaging end 320 of prong 318 also continues through the guided opening 314, maintaining making contact 330 along the face of the first semi-spherical ball lock 302 as it travels along the face. As each end 306, 320 travels further into each respective cavity 326, 314, the point of contact 332, 330 between the engaging ends 306, 320 of each prong 304, 328 moves from the tapered portion to an edge portion of each prong 304, 318. As the point of contact 332, 330 moves off each taper point to ach end point, this now has the effect of aligning each semi-sphere 302, 316 along a planar line 340 that runs in the direction of the locking mechanism 300. In the example of FIG. 4C, this effect results in the "flattening" of each semi-sphere face along plane 340, as each respective engaging end 306, 320 of each prong 304, 318 moves through each respective guided opening 326, 314. Of course, in other configurations, e.g., when the locking mechanism 300 is oriented vertically (for example, in a drone-locking application illustrated in FIG. 1), the effect of prong movement during a coupling process results in aligning each semi-sphere 302, 316 along a vertical planar line, thus "straightening" each semi-sphere along the vertical plane line.

Figure 4D:
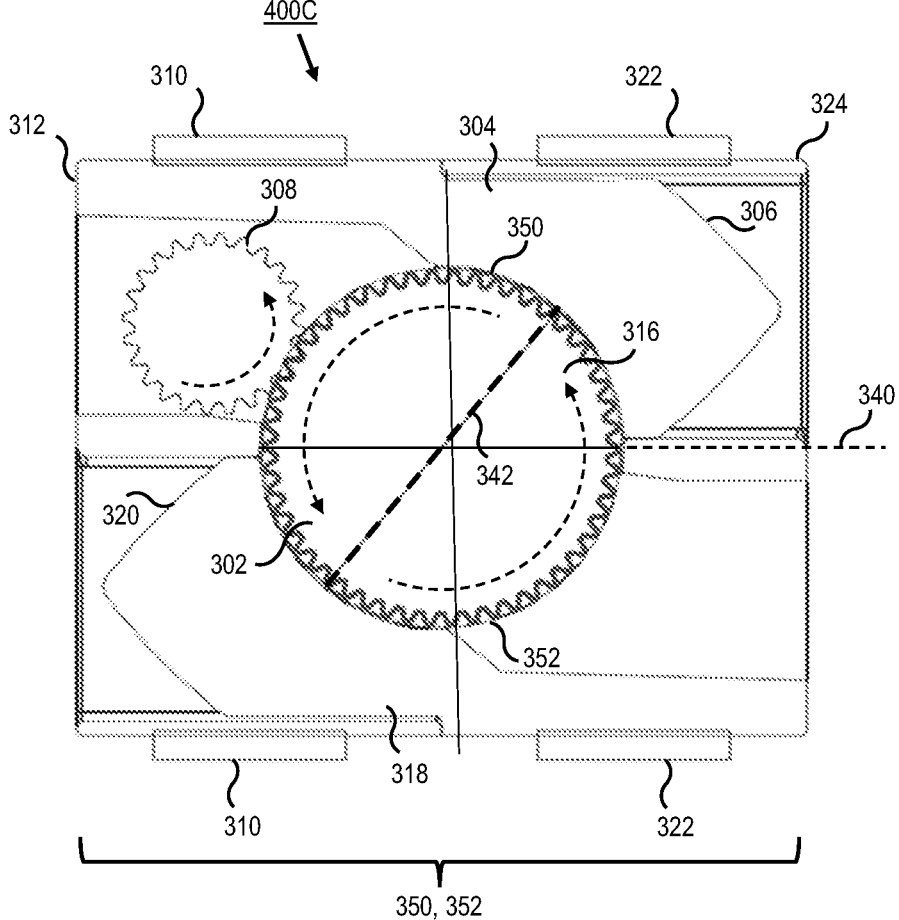
FIG. 4D illustrates a side view of two portions of a
locking mechanism in a fully coupled position, according to
some aspects of the present disclosure.

Continuing to the example 400D of FIG. 4D, the drawing shows the first locking portion 350 and second locking portion 352 fully coupled and locked. As can be seen in the figure, the engaging ends 306, 320 have travelled past the area of each semi-sphere 302, 316, resulting in each semi-sphere 302, 316 face being aligned along plane 340, and positioned within each cavity 350, 352 of each respective prong 304, 318. At this point, the locking mechanism (300) may be considered fully engaged. It is also at this point that the cavity (350, 352) formed from the engagement allows the engaged semi-spheres 320, 316 to rotate as a fully-formed sphere. In order to prevent the locking mechanism from moving (i.e., "locking" the mechanism), the spur gear 308, which was loaded (e.g., via spring, magnet, etc.) during the rotational movement of semi-sphere 302 during insertion, releases in the opposite direction as shown by the dotted arrow on spur gear 308.

This, in turn, causes the first semi-sphere portion 302 to rotate in a complimentary direction as shown in the dotted line of the first semi-sphere portion 302. This further causes the second semi-sphere portion 316 to synchronously rotate in the same direction as shown, due to the coupling of the face of the first semi-sphere portion 302 with the face of second semi-sphere portion 316. This results in the joining plane 342 of the first semi-sphere portion 302 and second semi-sphere portion 316 faces to be offset by a configured degree from the original joining plane 340 as shown in the figure. The configured degree may be determined from the amount of loading provided in the spur gear 308—the higher the rotational loading, the further the rotational offset will be. While it is conceivable that the locking effect may be achieved by as little as 1 degree in rotational offset, the stability of the lock would be more optimal using a larger offset (e.g., 5°, 10°, 30°, 45°, etc.). This offset advantageously provides a locking effect by preventing the semi-spherical ball locks 302, 316 from being able to move due to lateral forces that would typically be applied during a towing process when the vehicle 110 begins moving with the trailer 120 in tow.

In order to unlock the locking mechanism 300, the spur gear 308 may be operatively coupled to a motor, which is configured to rotate the spur gear 308 in the opposite direction to that shown in FIG. 4D, consequently forcing the spherical ball lock 302, 316 to rotate in the opposite direction as well, until the first semi-sphere portion 302 and second semi-sphere portion 316 become re-aligned with the original joining plane 340. Once re-aligned, the first locking portion 350 and second locking portion 352 may then be separated away from each other.

In the examples shown in FIGS. 4A-4D, only one spur gear (308) is illustrated for rotating the locking mechanism (300). However, in other examples, a second spur gear may be added to engage with second sphere portion 316 in order to assist the first spur gear 308 in its rotational duties. In some examples, if only one spur gear is used (e.g., 308), the locking mechanism may be configured such that the surface of the sphere portion that is not engaging with the spur gear (e.g., 316) can be smooth, i.e., without any gear protrusions. Such a configuration would help reduce manufacturing costs.

Figure 5:
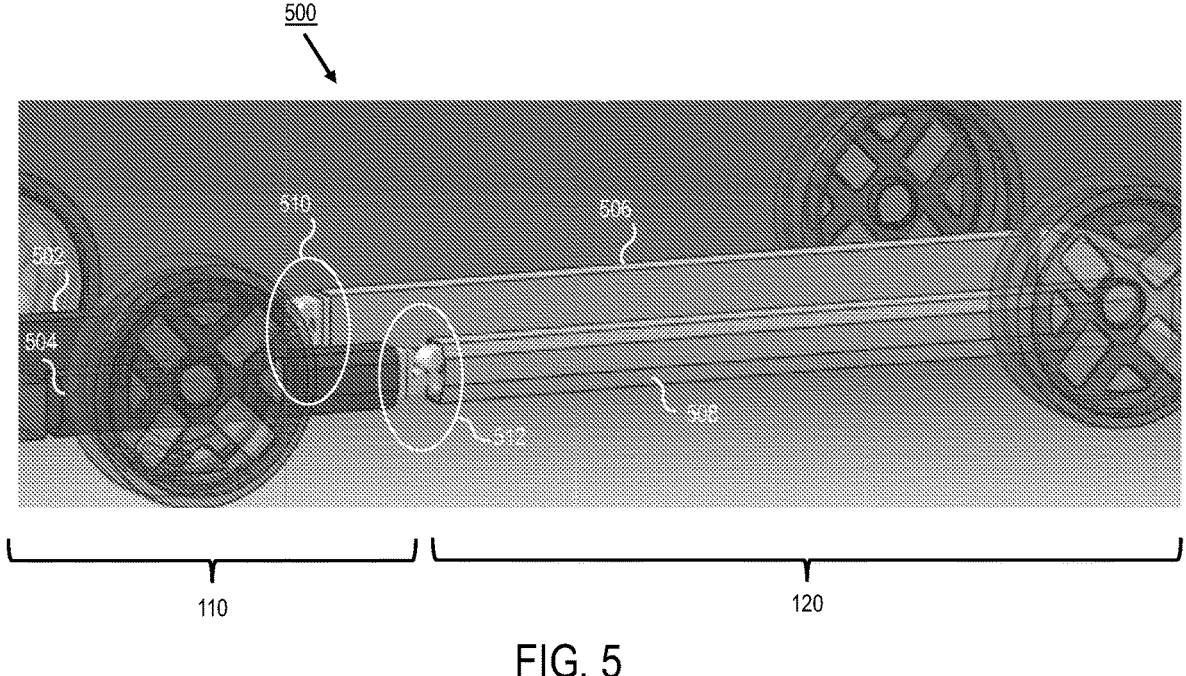
FIG. 5 illustrates a three-dimensional representation of an
exemplary placement of the locking mechanisms on the
frames of the vehicle and the trailer, according to some
aspects of the present disclosure.

FIG. 5 illustrates a three-dimensional representation of an exemplary placement 500 of the locking mechanisms (e.g., 300) on the frames (502-508) of the vehicle 110 and the trailer 120, according to some aspects of the present disclosure. As can be seen in the figure, each locking mechanism (e.g., 300) may be configured to be inserted into each frame end 510, 512 for the vehicle 110 and the 120. The locking mechanism (e.g., 300) may be configured such that the first locking portion (e.g., 350) is provided on the frame end(s) of the vehicle 110, and the second locking portion (e.g., 352) is provided on the frame end(s) of the trailer 120. It should be understood by a person having ordinary skill in the art that other placements of a locking mechanism are contemplated in the present disclosure. For example, depending on the geometrical shape and size of the vehicle/trailer frame, a greater (e.g., three or more locking mechanisms) or a lesser (e.g., one locking mechanism) number of locking mechanisms may be used. In some examples, a supplementary bracket or frame may be used to attach the locking mechanism(s) to a location other than (or in addition to) the actual vehicle/trailer frame itself.

Figures 6A, 6B, 6C:
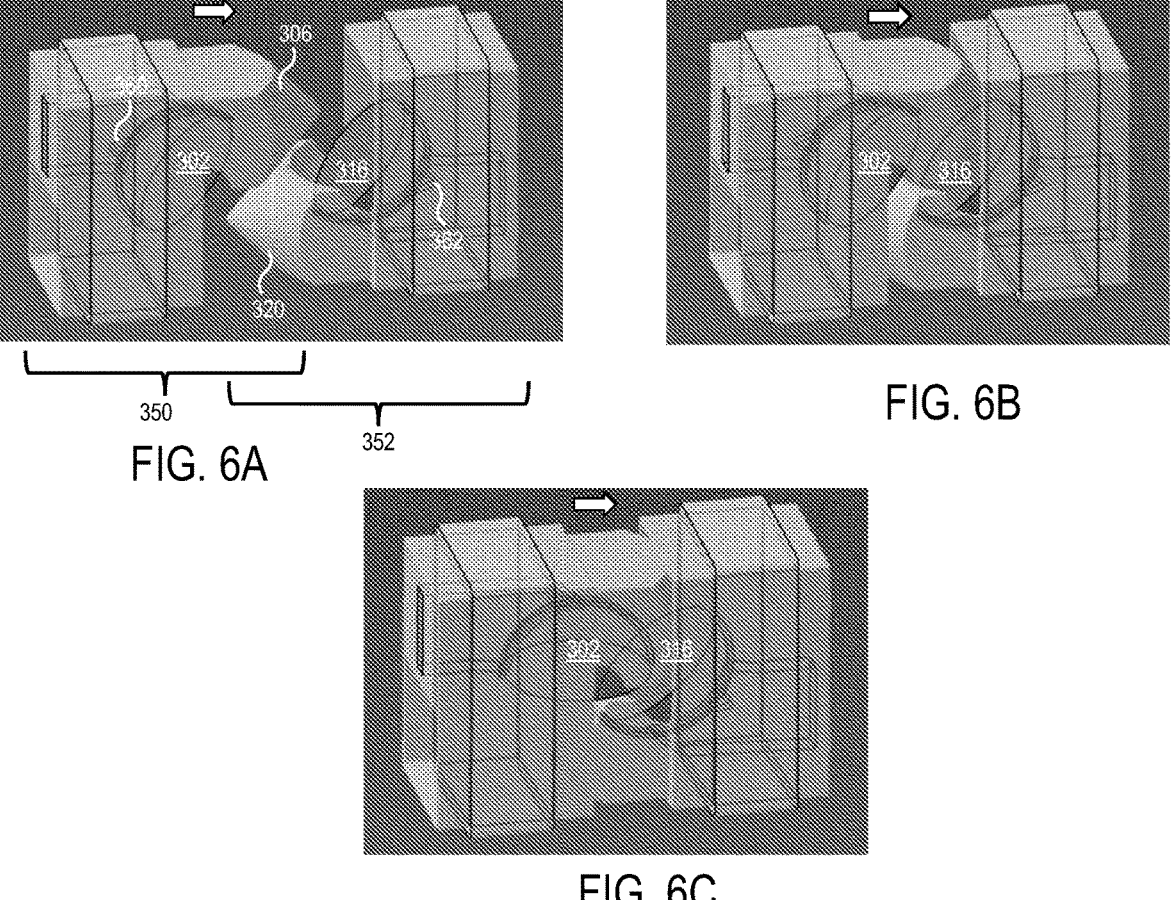
FIG. 6A illustrates a perspective three-dimensional view
of two portions a locking mechanism and ball lock prior to
the two portions coupling, according to some aspects of the
present disclosure.
FIG. 6B illustrates a perspective three-dimensional view
of two portions a locking mechanism and ball lock engaging
during a coupling process, according to some aspects of the
present disclosure.
FIG. 6C illustrates a perspective three-dimensional view
of two portions a locking mechanism and ball lock further
engaging during a coupling process, according to some
aspects of the present disclosure.

FIG. 6A illustrates a perspective three-dimensional view of two portions (350, 352) a locking mechanism and ball lock (300) prior to the two portions coupling, according to some aspects of the present disclosure. The examples of FIGS. 6A-6E are substantially similar to the examples of FIGS. 4A-4D, but are depicted in a three-dimensional format to facilitate a better understanding of the present disclosure. In these examples, first locking portion 350 includes the first semi-spherical ball lock 302, positioned inside the cavity of the first prong (e.g., 304) including the first tapered end 306. Here, a ball lock protrusion 360 is also included to function as a barrier (or "stopper") to stop the semi-sphere ball lock 302 from rotating past a configured position (i.e., the rotational offset from the initial joining plane). The second locking portion 352 includes the second semi-spherical ball lock 316, positioned inside the cavity of the second prong (e.g., 318) including the second tapered end 320.

Turning to FIG. 6B, the drawing illustrates the first semi-spherical ball lock 302 of first locking portion 350 being directed towards the second semi-spherical ball lock 316 of the second locking portion 352 in the direction shown in the figure. In FIG. 6C, the exemplary illustration shows the first tapered end (306) of the first locking portion (350) entering the opening (326) of the second locking portion in the direction shown by the large arrow, and the second tapered end (320) of the second locking portion (352) entering the opening (314) of the first locking portion (350). As can be seen in the figure, the first semi-spherical ball lock 302 has made contact with the second semi-spherical ball lock 316, and has begun the process of aligning the first semi-spherical ball lock 302 and second semi-spherical ball lock 316 along an initial joining plane (e.g., 340)

Figure 6D:
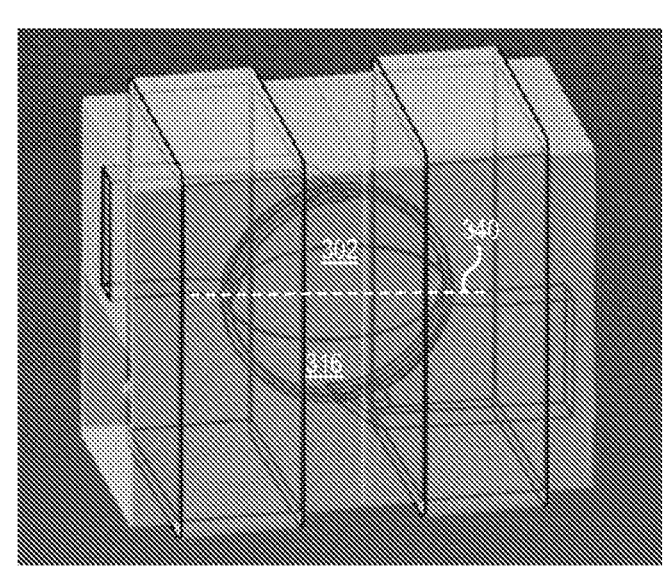
FIG. 6D illustrates a perspective three-dimensional view
of two portions a locking mechanism and ball lock engaged
during a coupling process, according to some aspects of the
present disclosure.
Figure 6E:
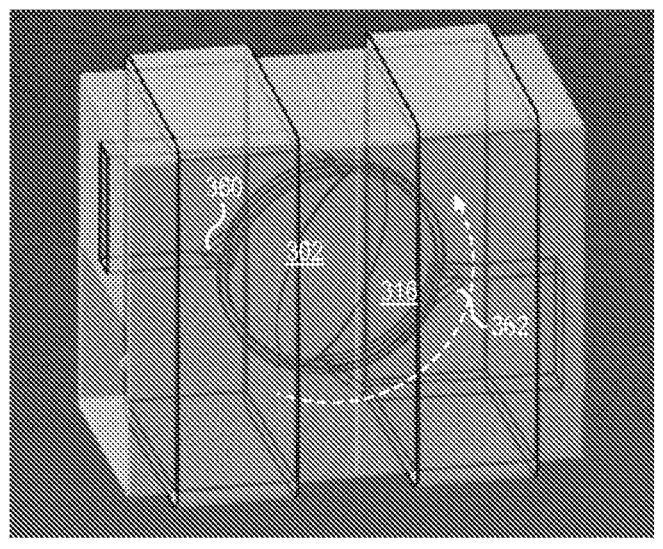
FIG. 6E illustrates a perspective three-dimensional view
of two portions a locking mechanism and ball lock during a
locking process, according to some aspects of the present
disclosure.

FIG. 6D show the first semi-spherical ball lock 302 in a fully engaged position with second semi-spherical ball lock 316, along the initial joining plane 340, forming the ball lock. In FIG. 6E, the ball lock, comprising the first semi-spherical ball lock 302 and second semi-spherical ball lock 316, is then rotated via spur gear (e.g., 308) in the direction shown in the dotted arrow, until the ball lock protrusion 360 makes contact with an inner surface of the housing (e.g., 312). In some examples, the ball lock protrusion 360 may be positioned on the first semi-spherical ball lock 302 to ensure the ball lock stops at a configured offset angle, as discussed above in connection with FIG. 4D. As will be seen in the example of FIG. 7, a ball lock protrusion may be added to the second semi-spherical ball lock 316 as well.

Figure 7:
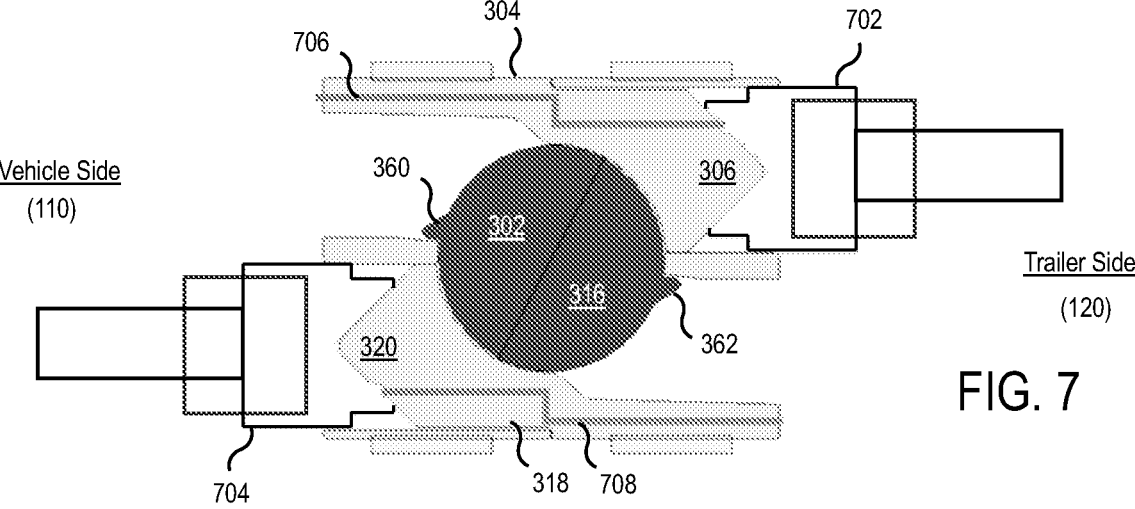
FIG. 7 illustrates a side view of a locking mechanism that
includes configurations for providing electrical and/or data
connection between the vehicle and the trailer, according to
some aspects of the present disclosure.

Turning to FIG. 7, the drawing illustrates a side view of a locking mechanism that includes configurations for providing electrical connection between the vehicle (110) and the trailer (120), according to some aspects of the present disclosure. This example illustrates the locking mechanism (e.g., 300) in a fully locked position, where the first semi-spherical ball lock 302 and second semi-spherical ball lock 316 have been rotated to their rotational offset angle, configured to a position by the ball lock protrusions 360, 362. As can be seen in the figure, a plurality of electrical connections 706, 708 may be configured, where a first electrical connection path 706 is configured within the body of the first prong 304 and a second electrical connection path 708 electrical connection path 708 is configured within the body of the second prong 318. Each electrical path 706, 708 may be configured to run one or more electrical connections.

Figure 8:
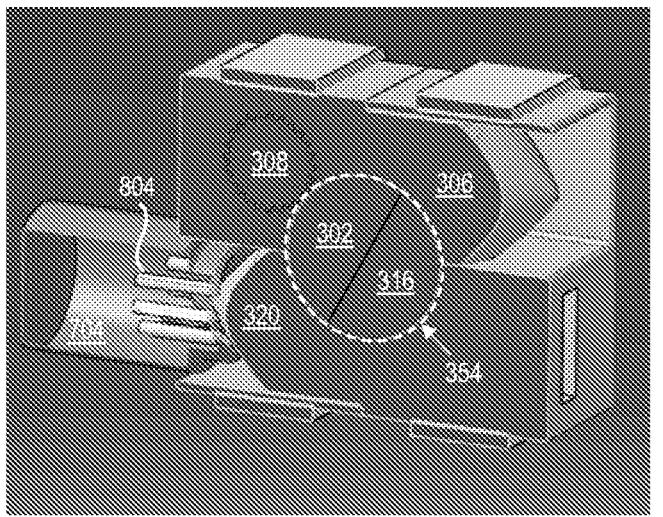
FIG. 8 illustrates a three-dimensional perspective view of
a locking mechanism including electrical and/or data cou-
plings, according to some aspects of the present disclosure.

The first electrical connection path 706 may be coupled to an electrical connector 702 that is configured to mechanically couple to tapered engaging end 306. As the engaging end 306 traverses past the ball lock (300) during coupling, the engaging end 306 finally connects to the electrical connector 702 to form an electrical connection between the vehicle side (110) and the trailer side (120). Similarly, the second electrical connection path 708 may be configured to mechanically couple to tapered engaging end 320. As the engaging end 320 traverses past the ball lock (300) during coupling, the engaging end 320 finally connects to the electrical connector 704 to form an electrical connection between the trailer side (120) and the vehicle side (110). As can be appreciated by a person having ordinary skill in the art, the configuration of FIG. 7 allows for dual electrical (and/or data) connectivity between a vehicle 110 and a trailer 12 to allow electrical power, data, etc. to be transmitted between the two. In some examples, only one connection path via a connector (e.g., 702) may be used between the vehicle 110 and trailer 120, depending on the specific application. As can be seen in the example of FIG. 8, a plurality of couplings 804 may be provided for each connector 704, where each individual coupling pin may provide specific power and/or data routings for transmission.

It should be understood by those skilled in the art that the term "electrical connection" is to be interpreted broadly as encompassing any kind of electrical and/or data signals transmitted in a vehicle. These include, but are not limited to, electrical power signals, control signals (e.g., Controller Area Network Bus, Local Interconnect Network Bus, Pulse-Width Modulation), sensor signals (e.g., wheel speed, temperature, pressure), communication signals (e.g., GPS, Wi-Fi, Bluetooth, cellular), safety signals (e.g., collision avoidance), lighting signals, and/or charging and battery signals. Signals such as charging and/or battery signals may be formatted and communicated using specific protocols and signaling methods for a vehicle and/or trailer. For example, the electrical connection may include bidirectional charging signals to allow the vehicle to both charge from an external power source (e.g., trailer) and send power back to a grid or another external device. The bidirectional charging signal may be configured using a Combined Charging System (CCS) format (e.g., ISO 15118) that uses DC fast charging protocols for electric vehicles.

Figure 9A:
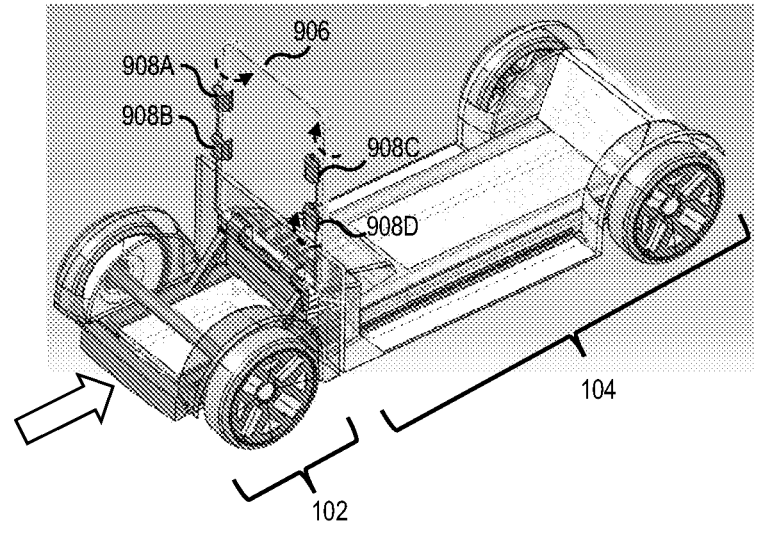
FIG. 9A illustrates a three-dimensional perspective view
of a torsion bar configuration for a vehicle for locking with
a trailer, with the torsion bar locks open, according to some
aspects of the present disclosure.

FIG. 9A illustrates a three-dimensional perspective view of a torsion bar 906 configuration for a vehicle 102 for locking with a trailer 104, with the torsion bar locks (908A-908D) open, according to some aspects of the present disclosure. As vehicle 102 couples with trailer 104, additional structural bracing may be advantageous to increase rigidity of the coupling, particularly if heavier weights are being towed in the trailer 104. Accordingly, the torsion bar 906 (or "torsion bracket") may be configured on a rear end of vehicle 102, or, alternately on a front end of trailer 104. The torsion bar 906 material may be manufactured out of any suitable rigid metal, plastic, ceramic, etc. material known in the art.

Figure 9B:
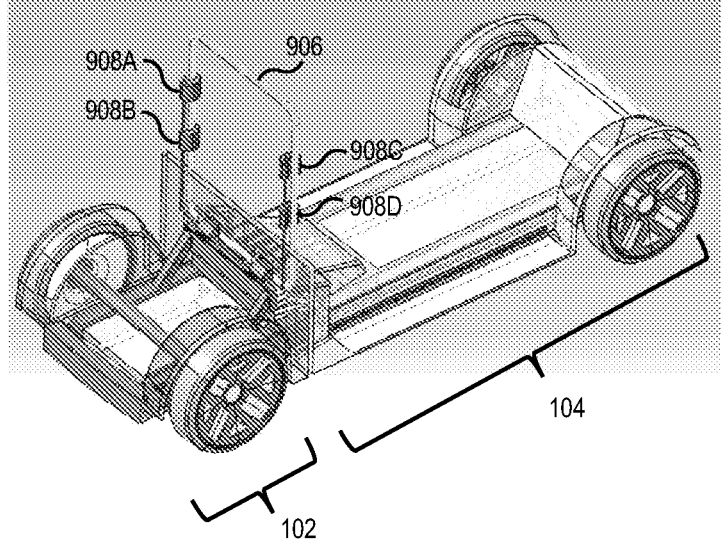
FIG. 9B illustrates a three-dimensional perspective view
of a torsion bar configuration for a vehicle for locking with
a trailer, with the torsion bar locks closed, according to some
aspects of the present disclosure.

Torsion fasteners 908A-908D are provided, where each of the torsion fasteners 908A-908D are positioned in a complementary position adjacent to torsion bar 906, and are configured to rotate and shown in the figure (dotted lines) to engage and secure the torsion bar 906 as shown in FIG. 9B. As used herein, a "complementary position", with respect to the torsion fasteners 908A-908D, means that the torsion fasteners 908A-908D are each positioned in a first open position to allow the torsion bar 906 to enter an area within each torsion fastener 908A-908D, wherein each torsion fastener 908A-908D may be rotatably positioned into a second, closed, position, to secure the torsion bar 906 from backing out. The rotation of each torsion fastener 908A-908D during the securing process may be configured using one or more motors to rotate each torsion fastener 908A-908D, either individually or in groups, from the first, open, position to the second, locked, position (FIG. 9B). Each torsion fastener 908A-908D may be configured with a locking mechanism (e.g., geared, slotted, etc.) to further fix (secure) each torsion fastener 908A-908D into place after rotating into the closed position.

Once the vehicle 102 and trailer 104 are coupled and locked (e.g., via ball lock 300, with or without torsion bar 906), the vehicle is configured to travel with the trailer in tow. However, given the three-wheeled characteristics of the vehicle and the ball lock, a specialized suspension system is needed to ensure stability and safety.

Figure 10:
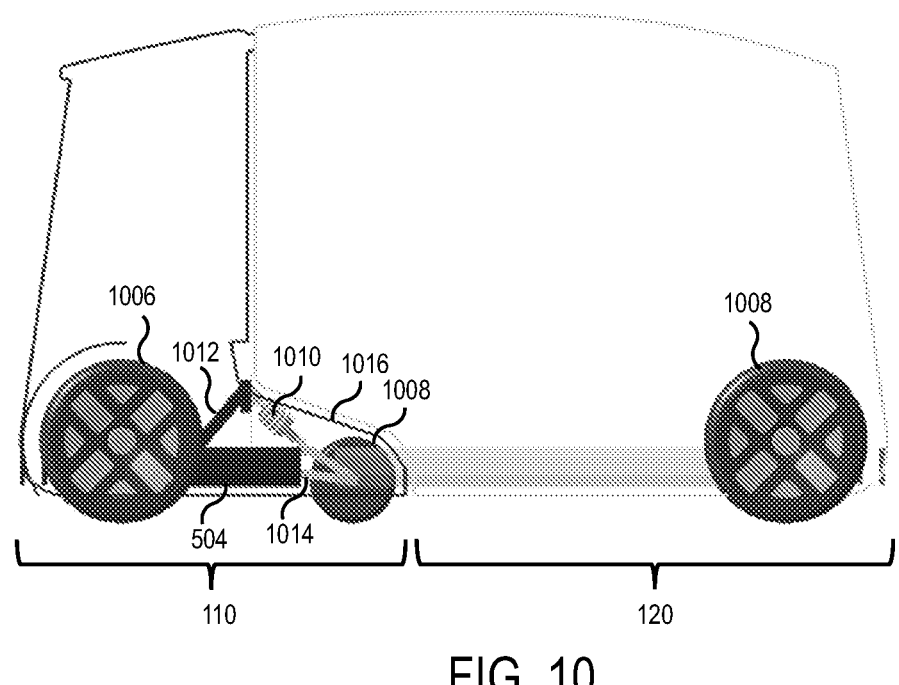
FIG. 10 illustrates a suspension configuration for a three-
wheeled vehicle to facilitate more stable drivability after
coupling to the trailer, according to come aspect of the
present disclosure.

FIG. 10 illustrates a suspension configuration for a three-wheeled vehicle to facilitate more stable drivability after coupling to the trailer, according to come aspect of the present disclosure. In this example, the vehicle 110 includes front wheels 1006 and a center-positioned rear wheel 1008. The center-positioned rear wheel 1008 may include a single wheel, as shown in the example, but may also include a multi-wheel configuration (e.g., a plurality of wheels configured together at a center position) as well, as long as the multi-wheel configuration is substantially centered (e.g., within a 10° range) in a rear portion of the vehicle 110 relative to the two front wheels 1006.

In this example, the center-positioned rear wheel 1008 is positioned between vehicle frames 504 and 502 (not shown in the figure) and is connected to a center suspension bracket 1014 that couples to one end of the shock absorber 1010, where the other end of shock absorber 1010 is coupled to a center suspension brace 1012, also positioned between front wheels 1006. In some examples, the center-positioned rear wheel 1008, suspension bracket 1014 and shock absorber 1010 are configured to be substantially enclosed within a central wheel well 1016 of vehicle 110. The central wheel well 1016 is positioned between the vehicle frames 504, 502 to provide coupling points for each ball lock (e.g., 510, 512). Under this configuration, the suspension of the vehicle 110 is protectively enclosed while still allowing the ball locks (510, 512) to freely engage, lock, unlock and disengage. However, given the configuration of the central wheel well 1016 relative to the vehicle frames (502, 504) and ball locks (510, 512), the suspension for the center-positioned wheel well 1016 has limited space and travel to effectively provide stability and safety during operation of the vehicle.

Figure 11:
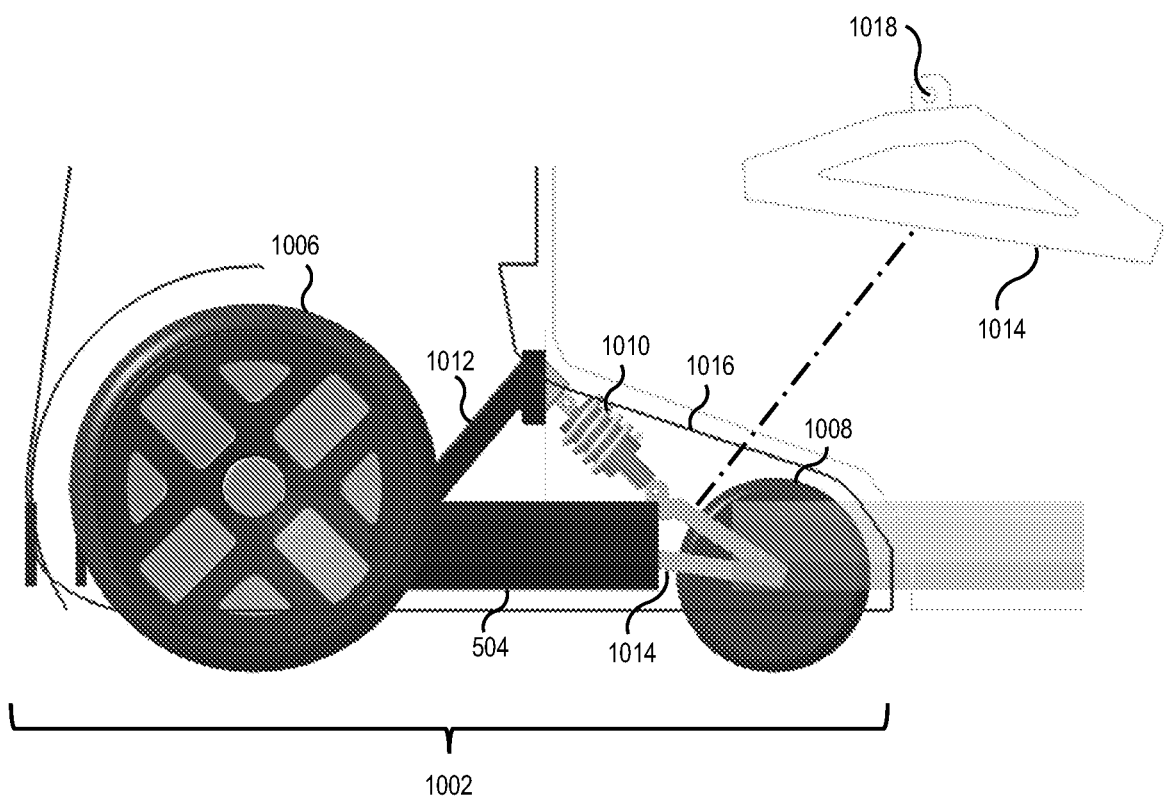
FIG. 11 shows a magnified illustration of the suspension
configuration of FIG. 10 for a three-wheeled vehicle to
facilitate more stable drivability after coupling to the trailer,
according to come aspect of the present disclosure.

FIG. 11 shows a magnified illustration of the suspension configuration of FIG. 10 for the three-wheeled vehicle 110 to facilitate more stable drivability after coupling to the trailer, according to come aspect of the present disclosure. Here, an enlarged view of the suspension bracket 1014 is shown, where the suspension bracket 1014 is configured as a polygonal (e.g., trapezoidal) shape, with an attachment point 1018 for receiving an end of the shock absorber 1018. In some examples, the shock absorber 1010 may include a spring, as well as a piston and cylinder assembly, configured in a cylindrical housing as shown. The shock absorber 1010 may further include working fluid, compression/rebound valves, as well as pressure and reserve chambers.

As the wheel 1008 moves upward, the shock absorber 1010 compresses, causing the shock absorber piston to move down into the cylinder, and, during this compression stroke, the shock absorber 1010 compression valves regulate the flow of working fluid (e.g., oil), offering resistance to the downward motion of the piston. The resistance provided by the valves converts the kinetic energy from the moving suspension into thermal energy in the oil, effectively damping the upward motion. As the wheel 1008 moves downward, the suspension extends, and the shock absorber piston is pulled out of the cylinder. During this rebound stroke, the rebound valves control the flow of oil. Once again, these valves offer resistance to the upward motion of the piston. The energy from the moving suspension is absorbed and dissipated as heat in the oil, effectively dampening the downward motion. In some examples, the shock absorber 1010 may be adjustable for tuning the damping characteristics to match the specific requirements of the vehicle, load, and road conditions. These adjustments can include altering the size and configuration of the valves, changing the viscosity of the hydraulic fluid, and modifying the spring rates in the suspension system.

Under the configurations shown, a center-positioned vehicle (e.g., three-wheeled vehicle) can utilize the rear wheel well cover 1016 as a "guide" to align the vehicle 110 during an approach to a trailer 120. In some examples, the wheel well cover 1016 may be tapered in shape to accentuate the guiding effect, i.e., the wheel well cover 1016 taper forcibly adjusts a moving vehicle into a docking area (142) during an approach into a centered position relative to the trailer 120, allowing the lateral ball locks on the vehicle frame (e.g., 510, 512) to engage properly. Given the limited spacing available within the interior area of the wheel well cover 1016, the disclosed suspension apparatus allows the vehicle 110 to have improved travel in a diagonal direction to allow the vehicle 110, as well as the trailer 120 to traverse better over rougher terrains.

FIG. 12 illustrates a method 1200 of operating a locking mechanism, such as the ones described above in connection with FIGS. 3-8. In some examples, the method comprises positioning a first locking portion (e.g., 350) for engagement with a second locking portion (e.g., 352) as shown in block 1202. The first locking portion may include a first housing (e.g., 312), a first prong (e.g., 304), comprising a first cavity (e.g., 350) and a first tapered engaging end (e.g., 306), a first semi-spherical ball lock (e.g., 302), configured within the cavity of the first prong, and a first opening (e.g., 314) in the first housing. The second locking portion (e.g., 352) may comprise a second housing (e.g., 324) a second prong (e.g., 318), comprising a second cavity (e.g., 352) and a second tapered engaging end (e.g., 320) a second semi-spherical ball lock (e.g., 316), configured within the cavity of the second prong, and a second opening (e.g., 326) in the second housing.

In block 1204, the method includes engaging the first locking portion with the second locking by positioning the first tapered end to contact a face of the second semi-spherical ball lock locking portion through the second opening (see FIGS. 4B-4C, 6C), and positioning the second tapered end to contact a face of the first semi-spherical ball lock locking portion through the first opening to rotatably align the first and second semi-spherical balls along a joining plane to form a spherical ball lock in the cavity of the first prong and the cavity of the second prong (see FIGS. 4D, 6D).

In block 1206, the method may further comprise engaging a spur gear (e.g., 308) with the spherical ball lock to rotatably offset the spherical ball lock from the joining plane to a configured offset plane for preventing the first locking portion and second locking portion from disengaging (see FIGS. 4D, 6E).

The following aspects are illustrative only and may be combined with other aspects or teachings described herein, without limitation.

Aspect 1 is a coupling mechanism, comprising a first locking portion, comprising (i) a first housing, (ii) a first prong, comprising a first cavity and a first tapered engaging end, (iii) a first semi-spherical ball lock, configured within the cavity of the first prong, and a (iv) first opening in the first housing; and a second locking portion, configured to engage with the first locking portion, the second locking portion comprising (i) a second housing, (ii) a second prong, comprising a second cavity and a second tapered engaging end, (iii) a second semi-spherical ball lock, configured within the cavity of the second prong, and a (iv) second opening in the second housing, wherein, during engagement, the first tapered end is configured to contact a face of the second semi-spherical ball lock locking portion through the second opening, and the second tapered end is configured to contact a face of the first semi-spherical ball lock locking portion through the first opening to rotatably align the first and second semi-spherical balls along a joining plane to form a spherical ball lock in the cavity of the first prong and the cavity of the second prong.

Aspect 2 may be combined with aspect 1 and includes a spur gear, configured to engage with the spherical ball lock, wherein the spur gear is configured to engage with the spherical ball lock to rotatably offset the spherical ball lock from the joining plane to a configured offset plane for preventing the first locking portion and second locking portion from disengaging.

Aspect 3 may be combined with any of aspects 1 and/or 2, and includes that the spur gear is configured to engage with the first semi-spherical ball lock via gear couplings to rotatably offset the spherical ball lock.

Aspect 4 may be combined with any of aspects 1 through 3, and includes that the spur gear is configured to further engage with the spherical ball lock to rotatably align the spherical ball lock back from the configured offset plane to the joining plane.

Aspect 5 may be combined with any of aspects 1 through 4, and includes a motor, operatively coupled to the spur gear, wherein the motor is configured to drive the spur gear to rotatably align the spherical ball lock from the joining plane to the configured offset plane.

Aspect 6 may be combined with any of aspects 1 through 5, and includes one or more electrical connection paths, configured within the first prong and/or the second prong, the one or more electrical connection paths being configured to transmit electrical and/or data signals between the first locking portion and the second locking portion.

Aspect 7 may be combined with any of aspects 1 through 6, and includes that the first locking portion is configured on a vehicle, and the second locking portion is configured on a trailer.

Aspect 8 is a method of operating a coupling mechanism, comprising: positioning a first locking portion for engagement with a second locking portion, the first locking portion comprising (i) a first housing, (ii) a first prong, comprising a first cavity and a first tapered engaging end, (iii) a first semi-spherical ball lock, configured within the cavity of the first prong, and a (iv) first opening in the first housing, and the second locking portion comprising (i) a second housing, (ii) a second prong, comprising a second cavity and a second tapered engaging end, (iii) a second semi-spherical ball lock, configured within the cavity of the second prong, and a (iv) second opening in the second housing; engaging the first locking portion with the second locking by positioning the first tapered end to contact a face of the second semi-spherical ball lock locking portion through the second opening, and positioning the second tapered end to contact a face of the first semi-spherical ball lock locking portion through the first opening to rotatably align the first and second semi-spherical balls along a joining plane to form a spherical ball lock in the cavity of the first prong and the cavity of the second prong.

Aspect 9 may be combined with aspect 8 and includes engaging a spur gear with the spherical ball lock to rotatably offset the spherical ball lock from the joining plane to a configured offset plane for preventing the first locking portion and second locking portion from disengaging.

Aspect 10 may be combined with any of aspects 8 and/or 9, and includes that engaging the spur gear comprises engaging with the first semi-spherical ball lock via gear couplings to rotatably offset the spherical ball lock.

Aspect 11 may be combined with any of aspects 8 through 10, and includes engaging the spur gear to rotatably align the spherical ball lock back from the configured offset plane to the joining plane.

Aspect 12 may be combined with any of aspects 8 through 11, and includes that engaging the spur gear comprises engaging the spur gear via a motor, operatively coupled to the spur gear, to drive the spur gear to rotatably align the spherical ball lock from the joining plane to the configured offset plane after the engagement.

Aspect 13 may be combined with any of aspects 8 through 12, and includes activating one or more electrical connection paths, configured within the first prong and/or the second prong, for transmitting electrical and/or data signals between the first locking portion and the second locking portion.

Aspect 14 may be combined with any of aspects 8 through 13, and includes that engaging the first locking portion with the second locking portion comprises engaging the first locking portion configured on a vehicle with the second locking portion configured on a trailer.

Aspect 15 is a coupling mechanism, comprising: a first locking portion configured on a vehicle, the first locking portion comprising (i) a first housing, (ii) a first prong, comprising a first cavity and a first tapered engaging end, (iii) a first semi-spherical ball lock, configured within the cavity of the first prong, and a (iv) first opening in the first housing; and a second locking portion configured on a trailer, the second locking portion configured to engage with the first locking portion, and the second locking portion comprising (i) a second housing, (ii) a second prong, comprising a second cavity and a second tapered engaging end, (iii) a second semi-spherical ball lock, configured within the cavity of the second prong, and a (iv) second opening in the second housing, wherein, during engagement, the first tapered end is configured to contact a face of the second semi-spherical ball lock locking portion through the second opening, and the second tapered end is configured to contact a face of the first semi-spherical ball lock locking portion through the first opening to rotatably align the first and second semi-spherical balls along a joining plane to form a spherical ball lock in the cavity of the first prong and the cavity of the second prong.

Aspect 16 may be combined with aspect 15 and includes a spur gear, configured to engage with the spherical ball lock, wherein the spur gear is configured to engage with the spherical ball lock to rotatably offset the spherical ball lock from the joining plane to a configured offset plane for preventing the first locking portion and second locking portion from disengaging.

Aspect 17 may be combined with any of aspects 15 and/or 16, and includes that the spur gear is configured to engage with the first semi-spherical ball lock via gear couplings to rotatably offset the spherical ball lock.

Aspect 18 may be combined with any of aspects 15 through 17, and includes that the spur gear is configured to further engage with the spherical ball lock to rotatably align the spherical ball lock back from the configured offset plane to the joining plane.

Aspect 19 may be combined with any of aspects 15 through 18, and includes that a motor, operatively coupled to the spur gear, wherein the motor is configured to drive the spur gear to rotatably align the spherical ball lock from the joining plane to the configured offset plane.

Aspect 20 may be combined with any of aspects 15 through 19, and includes one or more electrical connection paths, configured within the first prong and/or the second prong, the one or more electrical connection paths being configured to transmit electrical and/or data signals between the first locking portion and the second locking portion.

Aspect 21 is a vehicle and/or trailer and includes the coupling mechanisms of any of aspects 1 through 7, or aspects 15 through 20.

Aspect 22 is a method for coupling a vehicle and/or trailer, and includes the methods of any of aspects 8 through 14.

As described above, some or all illustrated features may be omitted in a particular implementation within the scope of the present disclosure, and some illustrated features may not be required for implementation of all examples. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A coupling mechanism, comprising:
a first locking portion, comprising (i) a first housing, (ii) a first prong, comprising a first cavity and a first tapered engaging end, (iii) a first semi-spherical ball lock, configured within the cavity of the first prong, and a (iv) first opening in the first housing; and
a second locking portion, configured to engage with the first locking portion, the second locking portion comprising (i) a second housing, (ii) a second prong, comprising a second cavity and a second tapered engaging end, (iii) a second semi-spherical ball lock, configured within the cavity of the second prong, and a (iv) second opening in the second housing,
wherein, during engagement, the first tapered end is configured to contact a face of the second semi-spherical ball lock through the second opening, and the second tapered end is configured to contact a face of the first semi-spherical ball lock through the first opening to rotatably align the first and second semi-spherical ball locks along a joining plane to form a spherical ball lock in the cavity of the first prong and the cavity of the second prong.

2. The coupling mechanism of claim 1, further comprising a spur gear, configured to engage with the spherical ball lock, wherein the spur gear is configured to engage with the spherical ball lock to rotatably offset the spherical ball lock from the joining plane to a configured offset plane for preventing the first locking portion and second locking portion from disengaging.

3. The coupling mechanism of claim 2, wherein the spur gear is configured to engage with the first semi-spherical ball lock via gear couplings to rotatably offset the spherical ball lock.

4. The coupling mechanism of claim 2, wherein the spur gear is configured to further engage with the spherical ball lock to rotatably align the spherical ball lock back from the configured offset plane to the joining plane.

5. The coupling mechanism of claim 2, further comprising a motor, operatively coupled to the spur gear, wherein the motor is configured to drive the spur gear to rotatably align the spherical ball lock from the joining plane to the configured offset plane.

6. The coupling mechanism of claim 1, further comprising one or more electrical connection paths, configured within the first prong and/or the second prong, the one or more electrical connection paths being configured to transmit electrical and/or data signals between the first locking portion and the second locking portion.

7. The coupling mechanism of claim 1, wherein the first locking portion is configured on a vehicle, and the second locking portion is configured on a trailer.

8. A method of operating a coupling mechanism, comprising:

positioning a first locking portion for engagement with a second locking portion, the first locking portion comprising (i) a first housing, (ii) a first prong, comprising a first cavity and a first tapered engaging end, (iii) a first semi-spherical ball lock, configured within the cavity of the first prong, and a (iv) first opening in the first housing, and the second locking portion comprising (i) a second housing, (ii) a second prong, comprising a second cavity and a second tapered engaging end, (iii) a second semi-spherical ball lock, configured within the cavity of the second prong, and a (iv) second opening in the second housing;

engaging the first locking portion with the second locking portion by positioning the first tapered end to contact a face of the second semi-spherical ball lock through the second opening, and positioning the second tapered end to contact a face of the first semi-spherical ball lock through the first opening to rotatably align the first and second semi-spherical ball locks along a joining plane to form a spherical ball lock in the cavity of the first prong and the cavity of the second prong.

9. The method of claim 8, further comprising engaging a spur gear with the spherical ball lock to rotatably offset the spherical ball lock from the joining plane to a configured offset plane for preventing the first locking portion and second locking portion from disengaging.

10. The method of claim 9, wherein engaging the spur gear comprises engaging with the first semi-spherical ball lock via gear couplings to rotatably offset the spherical ball lock.

11. The method of claim 9, further comprising engaging the spur gear to rotatably align the spherical ball lock back from the configured offset plane to the joining plane.

12. The method of claim 9, wherein engaging the spur gear comprises engaging the spur gear via a motor, operatively coupled to the spur gear, to drive the spur gear to rotatably align the spherical ball lock from the joining plane to the configured offset plane after the engagement.

13. The method of claim 8, further comprising activating one or more electrical connection paths, configured within the first prong and/or the second prong, for transmitting electrical and/or data signals between the first locking portion and the second locking portion.

14. The method of claim 8, wherein engaging the first locking portion with the second locking portion comprises engaging the first locking portion configured on a vehicle with the second locking portion configured on a trailer.

15. A coupling mechanism, comprising:

a first locking portion configured on a vehicle, the first locking portion comprising (i) a first housing, (ii) a first prong, comprising a first cavity and a first tapered engaging end, (iii) a first semi-spherical ball lock, configured within the cavity of the first prong, and a (iv) first opening in the first housing; and a second locking portion configured on a trailer, the second locking portion configured to engage with the first locking portion, and the second locking portion comprising (i) a second housing, (ii) a second prong, comprising a second cavity and a second tapered engaging end, (iii) a second semi-spherical ball lock, configured within the cavity of the second prong, and a (iv) second opening in the second housing, wherein, during engagement, the first tapered end is configured to contact a face of the second semi-spherical ball lock through the second opening, and the second tapered end is configured to contact a face of the first semi-spherical ball lock through the first opening to rotatably align the first and second semi-spherical ball locks along a joining plane to form a spherical ball lock in the cavity of the first prong and the cavity of the second prong.

16. The coupling mechanism of claim 15, further comprising a spur gear, configured to engage with the spherical ball lock, wherein the spur gear is configured to engage with the spherical ball lock to rotatably offset the spherical ball lock from the joining plane to a configured offset plane for preventing the first locking portion and second locking portion from disengaging.

17. The coupling mechanism of claim 16, wherein the spur gear is configured to engage with the first semi-spherical ball lock via gear couplings to rotatably offset the spherical ball lock.

18. The coupling mechanism of claim 16, wherein the spur gear is configured to further engage with the spherical ball lock to rotatably align the spherical ball lock back from the configured offset plane to the joining plane.

19. The coupling mechanism of claim 16, further comprising a motor, operatively coupled to the spur gear, wherein the motor is configured to drive the spur gear to rotatably align the spherical ball lock from the joining plane to the configured offset plane.

20. The coupling mechanism of claim 15, further comprising one or more electrical connection paths, configured within the first prong and/or the second prong, the one or more electrical connection paths being configured to transmit electrical and/or data signals between the first locking portion and the second locking portion.

* * * * *